(12) United States Patent
Yang et al.

(10) Patent No.: US 11,546,927 B2
(45) Date of Patent: Jan. 3, 2023

(54) REPORTING INFORMATION TRANSMISSION METHOD, USER SIDE DEVICE AND NETWORK SIDE DEVICE

(71) Applicant: VIVO MOBILE COMMUNICATION CO., LTD., Chang'an Dongguan (CN)

(72) Inventors: Yu Yang, Chang'an Dongguan (CN); Xueming Pan, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 114 days.

(21) Appl. No.: 16/631,758

(22) PCT Filed: Jul. 20, 2018

(86) PCT No.: PCT/CN2018/096430
§ 371 (c)(1),
(2) Date: Jan. 16, 2020

(87) PCT Pub. No.: WO2019/024693
PCT Pub. Date: Feb. 7, 2019

(65) Prior Publication Data
US 2020/0170027 A1 May 28, 2020

(30) Foreign Application Priority Data
Aug. 3, 2017 (CN) .......................... 201710657153.7

(51) Int. Cl.
*H04W 72/12* (2009.01)
*H04B 7/06* (2006.01)
(Continued)

(52) U.S. Cl.
CPC ...... *H04W 72/1242* (2013.01); *H04B 7/0626* (2013.01); *H04B 7/0632* (2013.01);
(Continued)

(58) Field of Classification Search
CPC ........... H04W 72/1242; H04W 56/001; H04W 72/0413; H04W 72/04; H04W 72/12;
(Continued)

(56) References Cited

U.S. PATENT DOCUMENTS

| 2014/0016475 A1 | 1/2014 | Zhou et al. |
| 2014/0140281 A1 | 5/2014 | Choudhury et al. |

(Continued)

FOREIGN PATENT DOCUMENTS

| CN | 102685707 A | 9/2012 |
| CN | 103107866 A | 5/2013 |

(Continued)

OTHER PUBLICATIONS

Extended European Search Report for European Application No. 18840771.2, dated Jul. 17, 2020 (Jul. 17, 2020)—9 pages.
(Continued)

*Primary Examiner* — Sharmin Chowdhury
(74) *Attorney, Agent, or Firm* — Culhane Meadows PLLC; Stephen J. Weed

(57) ABSTRACT

The present disclosure provides a reporting information transmission method, a user side device and a network side device. The reporting information transmission method includes: determining whether there is a resource conflict between uplink channel resources for carrying at least two pieces of reporting information, the at least two pieces of reporting information at least including two of a beam failure recovery request, Synchronization Signal (SS) block-based beam reporting, Channel State Information Reference Signal (CSI-RS)-based beam reporting, and CSI reporting; and when there is the resource conflict between the uplink channel resources, transmitting one or more of the at least two pieces of reporting information.

20 Claims, 5 Drawing Sheets

```
determining whether there is a resource conflict between uplink channel      101
resources for carrying at least two pieces of reporting information when there is the resource conflict between the uplink channel                102
resources, transmitting one or more of the at least two pieces of
reporting information
```

(51) Int. Cl.
*H04B 7/08* (2006.01)
*H04L 5/00* (2006.01)
*H04W 56/00* (2009.01)
*H04W 72/04* (2009.01)

(52) U.S. Cl.
CPC ........... *H04B 7/0639* (2013.01); *H04B 7/088* (2013.01); *H04L 5/0051* (2013.01); *H04W 56/001* (2013.01); *H04W 72/0413* (2013.01)

(58) Field of Classification Search
CPC . H04W 72/042; H04B 7/0626; H04B 7/0632; H04B 7/0639; H04B 7/088; H04B 7/06; H04L 5/0051; H04L 1/0027; H04L 1/0026; H04L 1/00; H04L 5/00; H04L 5/0053; H04L 5/0057
See application file for complete search history.

(56) References Cited

U.S. PATENT DOCUMENTS

| | | | |
|---|---|---|---|
| 2014/0341065 A1 | 11/2014 | Liao et al. | |
| 2015/0139101 A1 | 5/2015 | Guo et al. | |
| 2015/0271812 A1 | 9/2015 | Nam et al. | |
| 2017/0070277 A1* | 3/2017 | Si | H04L 1/0026 |
| 2017/0111887 A1* | 4/2017 | Hong | H04B 17/345 |
| 2018/0206223 A1* | 7/2018 | Kim | H04W 72/044 |
| 2018/0279293 A1* | 9/2018 | Harrison | H04L 5/0057 |
| 2019/0045499 A1* | 2/2019 | Huang | H04W 72/0446 |
| 2019/0349052 A1* | 11/2019 | Yum | H04L 1/0026 |
| 2020/0008245 A1* | 1/2020 | Yan | H04B 7/0695 |
| 2020/0068422 A1* | 2/2020 | Wang | H04W 72/046 |
| 2020/0127726 A1* | 4/2020 | Gao | H04L 1/0026 |
| 2020/0178338 A1* | 6/2020 | Ahn | H04B 7/0626 |
| 2021/0242988 A1* | 8/2021 | Kwak | H04L 5/0048 |

FOREIGN PATENT DOCUMENTS

| | | |
|---|---|---|
| CN | 103546249 A | 1/2014 |
| CN | 103580818 A | 2/2014 |
| CN | 104737482 A | 6/2015 |
| EP | 3618491 A1 | 3/2020 |

OTHER PUBLICATIONS

Huawei, HiSilicon: "On transmission of UCI on PUSCH," R1-1706958, 3GPP TSG RAN WG1 Meeting #89, Hangzhou, China, May 15, 2017, 3 pages.

Spreadtrum Communications: "Discussion on UE initiated recovery from beam failure," R1-1707782, 3GPP TSG RAN WG1 Meeting #89, Hangzhou, China, May 15, 2017, 5 pages.

Spreadtrum Communications: "Discussion on UE initiated recovery from beam failure," R1-1710364, 3GPP TSG RAN WG1 NR Ad-Hoc#2, Qingdao, China, Jun. 27, 2017, 5 pages.

1st Chinese Office Action for Chinese Application No. 201710657153.7, dated Aug. 9, 2019 (Aug. 9, 2019)—10 pages (English translation—4 pages).

International Preliminary Report on Patentability for International Application No. PCT/CN/2018/096430, dated Feb. 13, 2020 (Feb. 13, 2020)—5 pages.

International Search Report and Written Opinion for International Application No. PCT/CN/2018/096430, dated Sep. 27, 2018 (Sep. 27, 2018)—8 pages.

VIVO: "On CSI-RS design for NR," R1-1703390, 3GPP TSG RAN WG1 Meeting #88, Athens, Greece, Feb. 13-17, 2017 (Feb. 17, 2017), 5 pages.

ZTE: "Discussion on beam recovery mechanism," R1-1707121, 3GPP TSG RAN WG1 Meeting #89, Hangzhou, P.R. China May 15-19, 2017 (May 15, 2017), 8 pages.

1st European Office Action for European Application No. 18840771.2, dated Dec. 3, 2021 (Dec. 3, 2021)—6 pages.

* cited by examiner

REPORTING INFORMATION TRANSMISSION METHOD, USER SIDE DEVICE AND NETWORK SIDE DEVICE

CROSS-REFERENCE TO RELATED APPLICATION

The present application is the U.S. national phase of PCT Application No. PCT/CN2018/096430 filed on Jul. 20, 2018, which claims a priority of the Chinese patent application 201710657153.7 filed on Aug. 3, 2017, which are incorporated herein by reference in their entirety.

TECHNICAL FIELD

The present disclosure relates to the field of communication technology, in particular to a reporting information transmission method, a user side device and a network side device.

BACKGROUND

When a full-digital array is adopted in a massive Multiple-Input Multiple-Output (MIMO) technology, it is necessary to provide a large quantity of analog-to-digital (AD)/digital-to-analog (DA) converters and a large quantity of complete radio frequency (RF)-baseband processing channels. In order to reduce the implementation cost of the massive MIMO technology as well as a device complexity, a digital-analog hybrid beamforming technology emerges. In other words, a beamforming stage is added to an RF signal at a frontend proximate to an antenna system on the basis of conventional digital-domain beamforming. For analog beamforming technology, analog beams are transmitted at a full bandwidth. In addition, the analog beams are merely transmitted in a time-division multiplexing (TDM) manner by an array element in each polarization direction on each high-frequency antenna array panel. A beamforming weight value of the analog beam is achieved through adjusting a parameter of such a device as an RF frontend phase shifter. A network side device configures setup information about beam reporting, i.e., reporting setting, for a UE through high-layer signaling, and the reporting setting includes information about a content of the beam reporting, time-domain-related information about the beam reporting (periodic, aperiodic and semi-persistent), and information about frequency-domain granularity of the beam reporting. The information about the content in the beam reporting may include identification information about at least one optimum transmission beam selected by the UE, a physical layer measurement result of the beam selected by the UE (e.g., Layer 1 Reference Signal Received Power (L1-RSRP), and group information about the beams selected by the UE.

In a high-frequency communication system, a radio signal has a relatively short wavelength, so the signal transmission may easily be blocked and thereby interrupted. When radio link reestablishment in the related art is adopted, it is time-consuming, so a beam failure recovery mechanism has been introduced. In other words, a beam failure detection reference signal is monitored at a physical layer, and whether the quality of the reference signal meets a beam failure triggering condition is evaluated. When the triggering condition has been met, the UE may transmit a beam failure recovery request to a base station, and the beam failure recovery request may include recommended candidate beams for the base station. Upon the receipt of the beam failure recovery request, the base station may transmit response signaling, including switching to a new candidate beam, restarting beam search or any other indication, to the UE. Through this beam failure recovery mechanism, it is able to rapidly switch to a standby beam pair link (BPL, which includes a transmission beam and a reception beam) for the continuous transmission of control messages and data, thereby to achieve the rapid beam recovery.

Channel State Information (CSI) is reported by the UE to the base station, and it consists of a Channel Quality Indicator (CQI), a Precoding Matrix Indicator (PMI) and a Rank Indication (RI). A time-frequency-domain resource occupied by the CSI is controlled by the base station. The CSI may be reported periodically or aperiodically. The base station may configure parameters for reporting the CSI periodically through the high-layer signaling. The parameter for reporting the CSI periodically may be configured independently for each downlink carrier unit.

However, in the related art, there is no yet processing mechanism for the beam reporting, the CSI reporting and the beam failure recovery request when there is a conflict among the reported resources.

SUMMARY

In one aspect, the present disclosure provides in some embodiments a reporting information transmission method, including: determining whether there is a resource conflict between uplink channel resources for carrying at least two pieces of reporting information, the at least two pieces of reporting information at least including two of a beam failure recovery request, Synchronization Signal (SS) block-based beam reporting, Channel State Information Reference Signal (CSI-RS)-based beam reporting, and CSI reporting; and when there is the resource conflict between the uplink channel resources, transmitting one or more of the at least two pieces of reporting information.

In another aspect, the present disclosure provides in some embodiments a user side device, including: a determination unit configured to determine whether there is a resource conflict between uplink channel resources for carrying at least two pieces of reporting information, the at least two pieces of reporting information at least including two of a beam failure recovery request, SS block-based beam reporting, CSI-RS-based beam reporting, and CSI reporting; and a transmission unit configured to, when there is the resource conflict between the uplink channel resources, transmit one or more of the at least two pieces of reporting information.

In yet another aspect, the present disclosure provides in some embodiments a user side device, including a memory, a processor, and a program stored in the memory and executed by the processor. The processor is configured to execute the program so as to implement the above-mentioned reporting information transmission method.

In still yet another aspect, the present disclosure provides in some embodiments a computer-readable storage medium storing therein a program. The program is executed by a processor so as to implement the above-mentioned reporting information transmission method.

In still yet another aspect, the present disclosure provides in some embodiments a reporting information transmission method, including: when there is a resource conflict between uplink channel resources for carrying at least two pieces of reporting information, receiving one or more of the at least two pieces of reporting information, the at least two pieces of reporting information at least including two of a beam failure recovery request, SS block-based beam reporting, CSI-RS-based beam reporting, and CSI reporting; and processing the received reporting information.

In still yet another aspect, the present disclosure provides in some embodiments a network side device, including: a reception unit configured to, when there is a resource conflict between uplink channel resources for carrying at least two pieces of reporting information, receive one or more of the at least two pieces of reporting information, the at least two pieces of reporting information at least including two of a beam failure recovery request, SS block-based beam reporting, CSI-RS-based beam reporting, and CSI reporting; and a processing unit configured to process the received reporting information.

In still yet another aspect, the present disclosure provides in some embodiments a network side device, including a memory, a processor, and a program stored in the memory and executed by the processor. The processor is configured to execute the program so as to implement the above-mentioned reporting information transmission method.

In still yet another aspect, the present disclosure provides in some embodiments a computer-readable storage medium storing therein a program. The program is executed by a processor so as to implement the above-mentioned reporting information transmission method.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

An object of the present disclosure is to provide a reporting information transmission method, a user side device and a network side device, so as to solve the problems in the related art.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
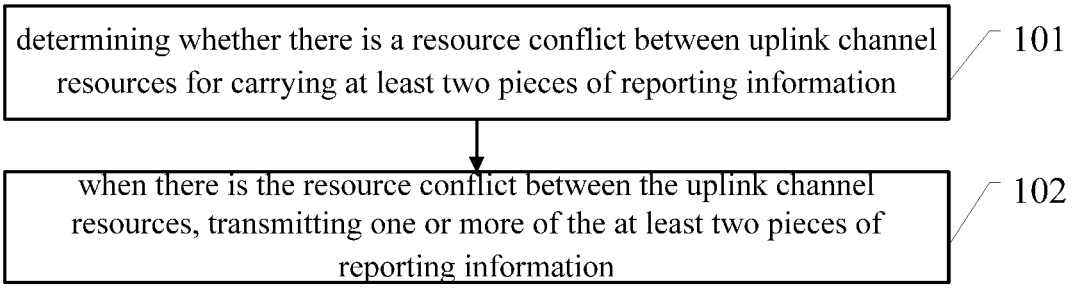
FIG. 1 is a flow chart of a reporting information transmission method according to one embodiment of the present disclosure.

The present disclosure provides in some embodiments a reporting information transmission method which, as shown in FIG. 1, includes Step 101 and Step 102.

Step 101: determining whether there is a resource conflict between uplink channel resources for carrying at least two pieces of reporting information.

The at least two pieces of reporting information may at least include two of a beam failure recovery request, SS block-based beam reporting, CSI-RS-based beam reporting, and CSI reporting It should be appreciated that, usually an SS block may include a Primary Synchronization Signal (PSS), a Secondary Synchronization Signal (SSS), and a Physical Broadcast Channel (PBCH).

It should be further appreciated that, usually the CSI reporting may include a Primary cell (Pcell) RI, a Secondary cell (Scell) RI, a Pcell wideband CQI/PMI, an Scell wideband CQI/PMI, a Pcell subband CQI/PMI, and an Scell subband CQI/PMI.

Step 102: when there is the resource conflict between the uplink channel resources, transmitting one or more of the at least two pieces of reporting information.

In the embodiments of the present disclosure, one or more pieces of uplink information may be transmitted when there is the conflict between the uplink channel resources for carrying the at least two pieces of reporting information, so as to provide an effective conflict processing mechanism for the resource conflict occurring when the beam reporting, the CSI reporting and the beam failure recovery request are reported. As a result, it is able for a network side device to accurately understand and accept reporting information from a user side device, ensure the reliability and robustness of a beam link preferentially, and use the uplink channel resources to carry the reporting information as much as possible.

In a possible embodiment of the present disclosure, Step 102 may include preferentially transmitting the reporting information with a highest priority level among the at least two pieces of reporting information.

In a possible embodiment of the present disclosure, the at least two pieces of reporting information may include first reporting information and second reporting information. Step 102 may include transmitting the first reporting information on the uplink channel resource, and dropping the second reporting information. The first reporting information may have a priority level higher than the second reporting information.

In the embodiments of the present disclosure, through transmitting the first reporting information on the uplink channel resource and dropping the second reporting information, it is able to report the first reporting information with the highest priority level in time.

In the embodiments of the present disclosure, Step 102 may further include transmitting the second reporting information on an available uplink channel resource next to the uplink channel resource.

In the embodiments of the present disclosure, the second reporting information may be transmitted on the available uplink channel resource next to the uplink channel resource, so as to prevent the second reporting information with a low priority level from being not reported due to the resource conflict.

In a possible embodiment of the present disclosure, the transmitting the first reporting information on the uplink channel resource may include transmitting the first reporting information on the uplink channel resource in an uplink channel format corresponding to the first reporting information, and the uplink channel format may be used to indicate a type of the reporting information.

In another possible embodiment of the present disclosure, the transmitting the first reporting information on the uplink channel resource may include carrying indication information in a message for transmitting the first reporting information, and the indication information may be used to indicate a type of the reporting information.

Based on the above, the type of the reporting information may be indicated implicitly or explicitly, so as to enable the network side device to determine the type of the reporting information.

In a possible embodiment of the present disclosure, the at least two pieces of reporting information may include first reporting information and second reporting information. Step 102 may include, when the uplink channel resource is sufficient to carry the first reporting information and parts of or all of contents in the second reporting information, using the uplink channel resource to carry, and transmit, the first reporting information and parts of or all of the contents in the second reporting information on the premise that the first reporting information is carried by the uplink channel resource.

In the embodiments of the present disclosure, when the uplink channel resource is sufficient to carry the first reporting information and parts of or all of the contents in the second reporting information, it is able for the uplink channel resource to carry parts of or all of the contents in the second reporting information on the premise that the first reporting information is carried by the uplink channel resource, thereby to make full use of the uplink channel resource, and improve the uplink transmission efficiency of a communication system.

In a possible embodiment of the present disclosure, the using the uplink channel resource to carry the first reporting information and parts of or all of the contents in the second reporting information may include using the uplink channel resource to carry information acquired through jointly encoding the first reporting information and parts of or all of the contents in the second reporting information.

In the embodiments of the present disclosure, through the joint encoding, it is able to further improve a utilization rate of the uplink channel resource.

In another possible embodiment of the present disclosure, the using the uplink channel resource to carry the first reporting information and parts of or all of the contents in the second reporting information may include using the uplink channel resource to carry the first reporting information and parts of or all of the contents in the second reporting information in a multiplexing manner.

In the embodiments of the present disclosure, through multiplexing, it is able to further improve the utilization rate of the uplink channel resource.

Especially, in the embodiments of the present disclosure, when the first reporting information and parts of the contents in the second reporting information are carried by the uplink channel resource, the second reporting information may be the CSI reporting.

It should be appreciated that, among the above four types of reporting information, usually the beam failure recovery request, the SS block-based beam reporting and the CSI-RS-based beam reporting need to be reported completely, and merely the CSI reporting is allowed to be reported partially. Hence, when parts of the contents in the reporting information are reported, the reporting information may be the CSI reporting.

To be specific, when the second reporting information is the CSI reporting, the using the uplink channel resource to carry the first reporting information and parts of the contents in the second reporting information may include using the uplink channel resource to carry, and transmit, the following contents in the CSI reporting as many as possible: the Pcell RI, the Scell RI, the Pcell wideband CQI/PMI, the Scell wideband CQI/PMI, the Pcell subband CQI/PMI and the Scell subband CQI/PMI which are ranked in a descending order of priority levels.

Further, when the information of a same type for a plurality of Scells needs to be reported, the using the uplink channel resource to carry the first reporting information and parts of the contents in the second reporting information may include preferentially reporting content about an Scell with a minimum cell index value.

In a possible embodiment of the present disclosure, the beam failure recovery request, the SS block-based beam reporting, the CSI-RS-based beam reporting and the CSI reporting may be ranked in a descending order of the priority levels as: the beam failure recovery request, the SS block-based beam reporting, the CSI-RS-based beam reporting and the CSI reporting; or the beam failure recovery request, the CSI-RS-based beam reporting, the SS block-based beam reporting and the CSI reporting; the SS block-based beam reporting, the CSI-RS-based beam reporting, the beam failure recovery request, and the CSI reporting; or the CSI-RS-based beam reporting, the SS block-based beam reporting, the beam failure recovery request and the CSI reporting.

Further, the priority levels of any two of the beam failure recovery request, the SS block-based beam reporting, the CSI-RS-based beam reporting and the CSI reporting may be configured by the network side device or predetermined in a protocol.

In a possible embodiments of the present disclosure, the uplink channel resources for carrying the beam failure recovery request, the SS block-based beam reporting, the CSI-RS-based beam reporting and the CSI reporting may be configured by the network side device, or predetermined by the network side device and a protocol.

Further, when any of the uplink channel resources is a periodic resource, the uplink channel resource may be configured by the network side device, and configuration information about the uplink channel resource may include a cycle value and an offset value.

Alternatively, when any of the uplink channel resources is a periodic resource, the uplink channel resource may be predetermined by the network side device and a protocol, configuration information about the uplink channel resource may include an offset value, and a cycle value of the uplink channel resource may be predetermined in a protocol.

Alternatively, when any of the uplink channel resources is an aperiodic resource, the uplink channel resource may be configured by the network side device, and configuration information about the uplink channel resource may include a time-domain resource and a frequency-domain resource for an uplink channel.

In a possible embodiment of the present disclosure, when the at least two pieces of reporting information includes the first reporting information, the second reporting information and third reporting information, Step 102 may include preferentially transmitting the reporting information with a highest priority level among the first reporting information, the second reporting information and the third reporting information.

When the plurality of pieces of reporting information needs to be carried jointly, the reporting information capable of being carried by the uplink channel resources may be determined sequentially in accordance with the priority levels ranked in a descending order. Of course, it should be appreciated that, after the plurality of pieces of reporting information to be carried has been determined, the plurality of pieces of reporting information may be carried in an order not limited to the order of the priority levels. In addition, the plurality of pieces of reporting information may be carried in a joint encoding manner, or in a multiplexing manner.

Similarly, when the at least two pieces of reporting information for which the resource conflict occurs include the abovementioned four types of reporting information, or when there exists any other reporting information apart from the abovementioned four types of reporting information and the at least two pieces of reporting information for which the resource conflict occurs include more than four types of reporting information, the at least two pieces of reporting information may also be reported in accordance with the priority levels in a descending order.

The reporting information transmission method will be described hereinafter in more details in conjunction with the embodiments.

Figure 2:
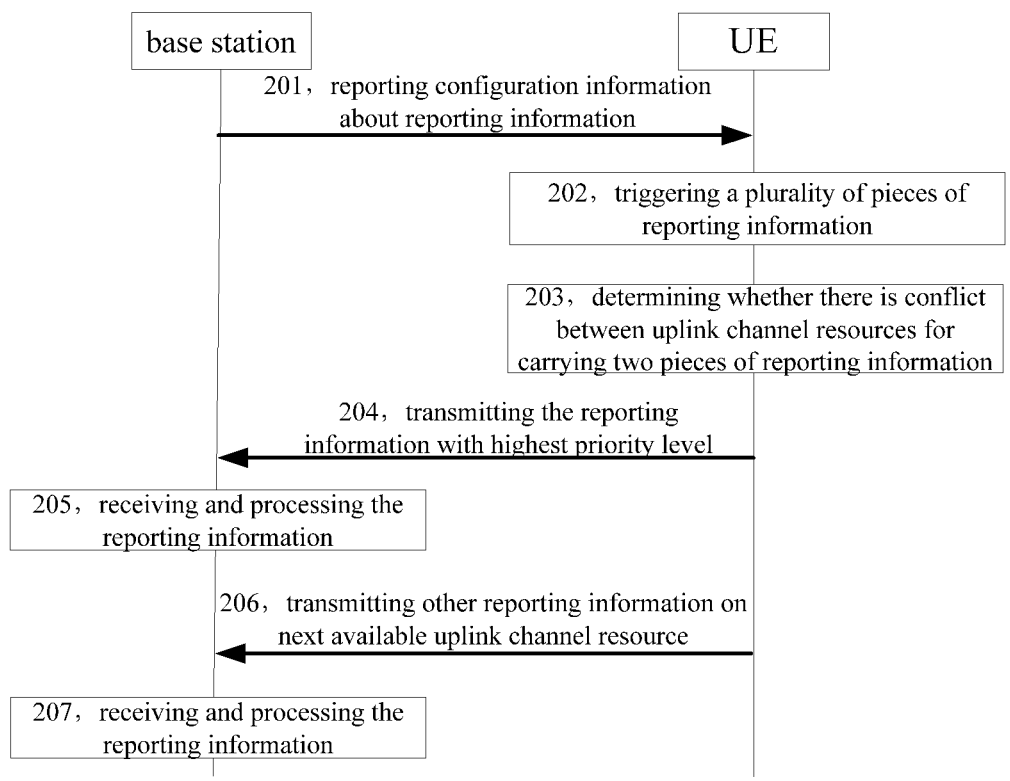
FIG. 2 is a schematic view showing an interaction procedure of the reporting information transmission method according to one embodiment of the present disclosure.

FIG. 2 shows an interaction procedure of the reporting information transmission method. In FIG. 2, the network side device is a base station, and the network side device is a User Equipment (UE). The reporting information transmission method may include the following steps.

Step 201: transmitting, by the base station, configuration information about the reporting information to the UE.

It should be appreciated that, in the embodiments of the present disclosure, the types of the reporting information may include the beam reporting, the beam failure recovery request, and the CSI reporting. In addition, the beam reporting may further include the SS block-based beam reporting and the CSI-RS-based beam reporting. For ease of description, the beam failure recovery request may be called as request for short.

It should be further appreciated that, the network side device, e.g., the base station, may transmit the configuration information about the reporting information to the user side device, e.g., the UE, through high-layer signaling, e.g., Radio Resource Control (RRC) signaling.

For example, the network side device may configure reporting setting about the beam reporting through the high-layer signaling (the RRC signaling). The reporting setting may include contents of the beam reporting, time-domain-related information, and information about an occupied time-domain resource and an occupied frequency-domain resource. When the time-domain-related information is periodic reporting, it is necessary to configure a cycle value and an offset value. The contents of the beam reporting may include identification information about a transmission (Tx) beam, and information about L1-RSRP. Hence, the beam reporting may also be called as L1-RSRP reporting.

For the SS block-based beam reporting, its contents may include the identification information about the Tx beam (e.g., an SS block time index), and SS block-based L1-RSRP.

For the CSI-RS-based beam reporting, its contents may include the identification information about the Tx beam (e.g., a CSI-RS resource and a time index), and CSI-RS-based L1-RSRP.

For another example, the base station may configure the configuration information about the CSI reporting for the UE through the high-layer signaling in accordance with provisions in the related art.

For yet another example, for a beam failure recovery mechanism, the network side device may configure the uplink channel resource for the request through the high-layer signaling.

In addition, in a possible embodiment of the present disclosure, a processing rule for the conflict between the uplink channel resources for different pieces of reporting information may be predetermined in a protocol, or configured by the network side device.

It should be appreciated that, the processing rule may include how to report the reporting information when there is the conflict between the uplink channel resources for carrying the reporting information.

Generally speaking, the priority levels of the reporting information may be predetermined.

In a possible embodiment of the present disclosure, the priority levels of the reporting information may be ranked in a descending order as: the request>the SS block-based beam reporting>the CSI-RS-based beam reporting>the CSI reporting.

In another possible embodiment of the present disclosure, the priority levels of the reporting information may be ranked in a descending order as: the request>the CSI-RS-based beam reporting>the SS block-based beam reporting>the CSI reporting.

In another possible embodiment of the present disclosure, the priority levels of the reporting information may be ranked in a descending order as: the SS block-based beam reporting>the CSI-RS-based beam reporting>the request>the CSI reporting.

In another possible embodiment of the present disclosure, the priority levels of the reporting information may be ranked in a descending order as: the CSI-RS-based beam reporting>the SS block-based beam reporting>the request>the CSI reporting.

Of course, the priority levels of the reporting information may also be ranked in any other order, which will not be particularly defined herein.

After the priority levels have been determined, it is necessary to further determine a transmission rule under the priority levels. In the embodiments of the present disclosure, a dropping rule may be selected as the transmission rule, i.e., merely the reporting information with the highest priority level may be reported and the other reporting information may be dropped when there is the conflict.

Step 202: triggering, by the UE, a plurality of pieces of reporting information.

It should be appreciated that, for the beam reporting and the CSI reporting, usually they may be reported periodically. When a corresponding reporting period has arrived, the UE may trigger the reporting of the beam reporting or the CSI reporting. Of course, it should be appreciated that, the UE may also not report the beam reporting or the CSI reporting when the corresponding reporting period has arrived.

For the request, when a triggering condition for the request has been met, the UE may transmit the request to the base station on the uplink channel resource configured by a network. The triggering condition for the request may include, e.g., that the UE has detected a beam failure event. To be specific, the beam failure event may refer to a situation where quality of a beam link for transmitting the PDCCH is lower than a predetermined threshold. Of course, there may also exist any other scenarios for triggering the beam failure event, which will not be listed herein.

Step 203: determining, by the UE, that there is a conflict between the uplink channel resources for carrying the at least two pieces of reporting information.

The UE may determine whether there is the conflict between the uplink channel resources for carrying the at least two pieces of reporting information in accordance with a condition of the uplink channel resources ready for carrying the reporting information.

In a scenario where there is no resource conflict, the reporting information may be directly transmitted as that in the related art, which will thus not be particularly defined herein.

In a scenario where there is the resource conflict, obviously the UE may determine the at least two pieces of reporting information where the conflict occurs.

Figure 3:
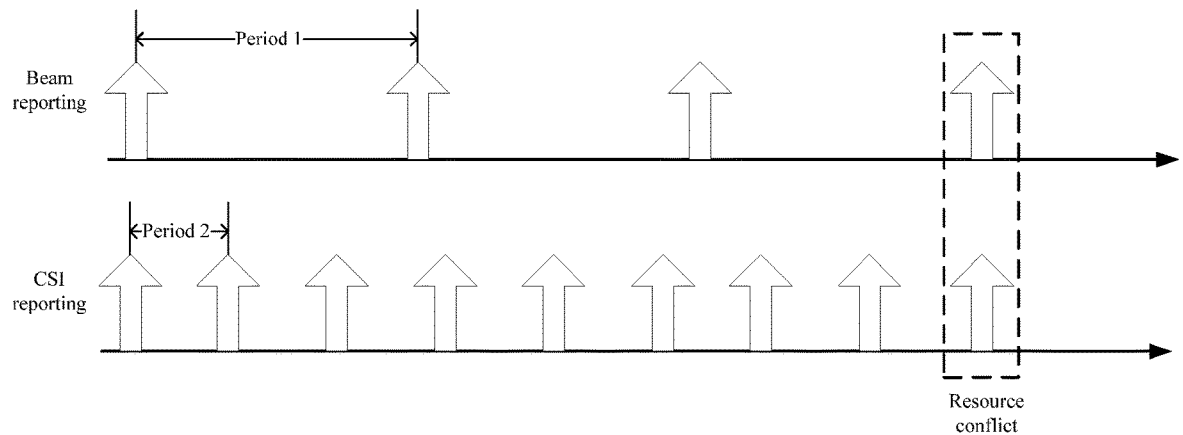
FIG. 3 is a schematic view showing a scenario where there is a resource conflict according to one embodiment of the present disclosure.

FIG. 3 shows a scenario where there is the resource conflict. In FIG. 3, each arrow represents the uplink channel resource for the reporting information. The UE may transmit the beam reporting with period 1 as a transmission period, and transmit the CSI reporting with period 2 as a transmission period. On the uplink channel resources represented by dotted boxes in FIG. 3, there is the resource conflict for the beam reporting and the CSI reporting.

Figure 4:
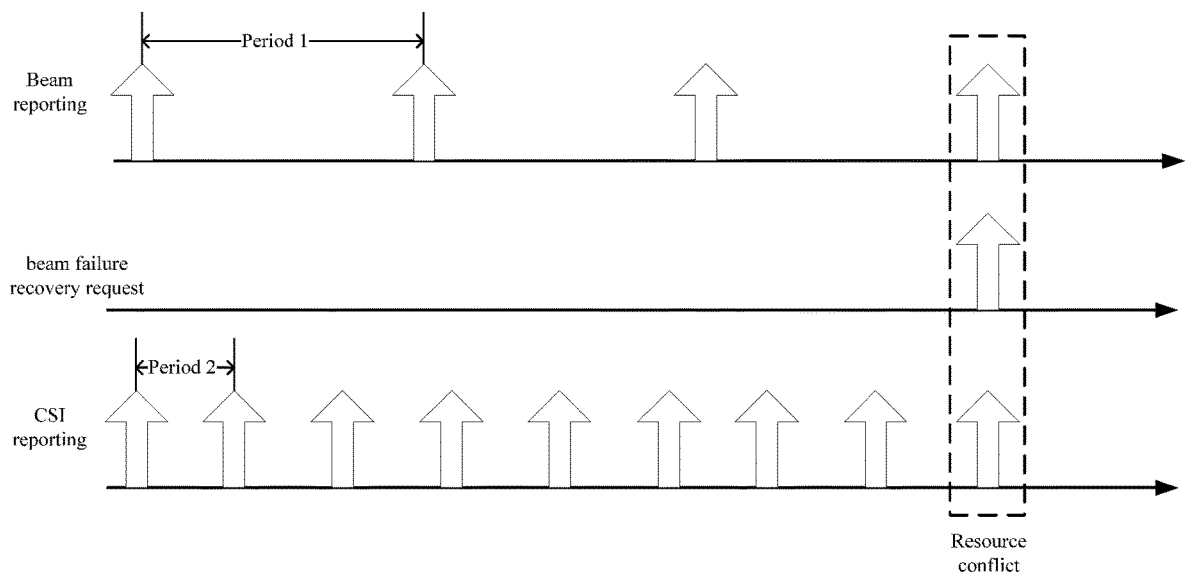
FIG. 4 is another schematic view showing the scenario where there is the resource conflict according to one embodiment of the present disclosure.

FIG. 4 shows another scenario where there is the resource conflict. In the scenario as shown in FIG. 4, there is the resource conflict for the beam reporting, the request and the CSI reporting on the uplink channel resources represented by the dotted boxes.

Step 204: transmitting, by the UE, the reporting information with the highest priority level.

Depending on the processing rule predetermined in a protocol or preconfigured by the network side device, the UE may select the reporting information.

In the embodiments of the present disclosure, the UE may transmit the reporting information with the highest priority level on the uplink channel resources where there is the conflict, and drop the other reporting information.

Based on the order of the priority levels defined in Step 201, the priority level of each of the beam reporting and the request is higher than that of the CSI reporting.

Hence, when it is necessary to transmit the beam reporting and the CSI reporting simultaneously, the UE may transmit the beam reporting and drop the CSI reporting. When it is necessary to transmit the request and the CSI reporting simultaneously, the UE may transmit the request and drop the CSI reporting, so that the base station may recover a downlink beam link in accordance with the request.

For the request and the beam reporting, when the priority level of the request is higher than that of the beam reporting and it is necessary to transmit the request and the beam reporting simultaneously, the UE may transmit the request and drop the beam reporting so that the base station may recover the downlink beam link in accordance with the request. Then, the UE may report a beam measurement result on a next available uplink channel resource. When the priority level of the beam reporting is higher than that of the request and it is necessary to transmit the request and the beam reporting simultaneously, the UE may transmit the beam reporting and drop the request, and then transmit the request on a next available uplink channel resource.

For the SS block-based beam reporting and the CSI-RS-based beam reporting, when the priority level of the SS block-based beam reporting is higher than that of the CSI-RS-based beam reporting, the UE may transmit the SS block-based beam reporting and drop the CSI-RS-based beam reporting. Otherwise, the UE may transmit the CSI-RS-based beam reporting and drop the SS block-based beam reporting.

Of course, in a scenario where the request, the beam reporting and the CSI reporting need to be transmitted simultaneously, the reporting information with the highest priority level may be transmitted in accordance with the above-mentioned order of the priority levels.

In addition, during the transmission of the reporting information, a type of the reporting information may be indicated to the network side device, e.g., the base station, in an explicit or implicit manner.

When the type of the reporting information, e.g., the first reporting information, is indicated implicitly, a corresponding uplink channel format may be set for the first reporting information, and the uplink channel format may be used to indicate the type of the reporting information.

When the type of the reporting information, e.g., the first reporting information, is indicated explicitly, corresponding indication information may be carried in the first reporting information, and the indication information may be used to indicate the type of the reporting information.

Step 205: receiving and processing, by the base station, the reporting information.

When the base station has monitored on the corresponding uplink channel resource that a signal has arrived, the base station may receive the reporting information on the corresponding uplink channel resource, and process the received reporting information.

In addition, the base station may further determine the type of the reporting information in accordance with the explicit or implicit indication from the UE.

When the type of the reporting information is implicitly indicated by the UE, the base station may determine the type of the reporting information in accordance with the uplink channel format of the received reporting information.

When the type of the reporting information is explicitly indicated by the UE, the base station may determine the type of the reporting information in accordance with the indication information in the received reporting information.

Step 206: transmitting, by the UE, the other reporting information on a next available uplink channel resource.

In a possible embodiment of the present disclosure, after the reporting information with the highest priority level has been transmitted, the UE may transmit the other reporting information on the next available uplink channel resource. To be specific, the UE may transmit the other reporting information one by one in accordance with the priority levels, with reference to Step 204.

Step 207: receiving and processing, by the base station, the reporting information.

Correspondingly, subsequent to Step 206, the base station may receive the other reporting information on the next available uplink channel resource.

Of course, it should be appreciated that, the UE may also not transmit the other reporting information any more.

Figure 5:
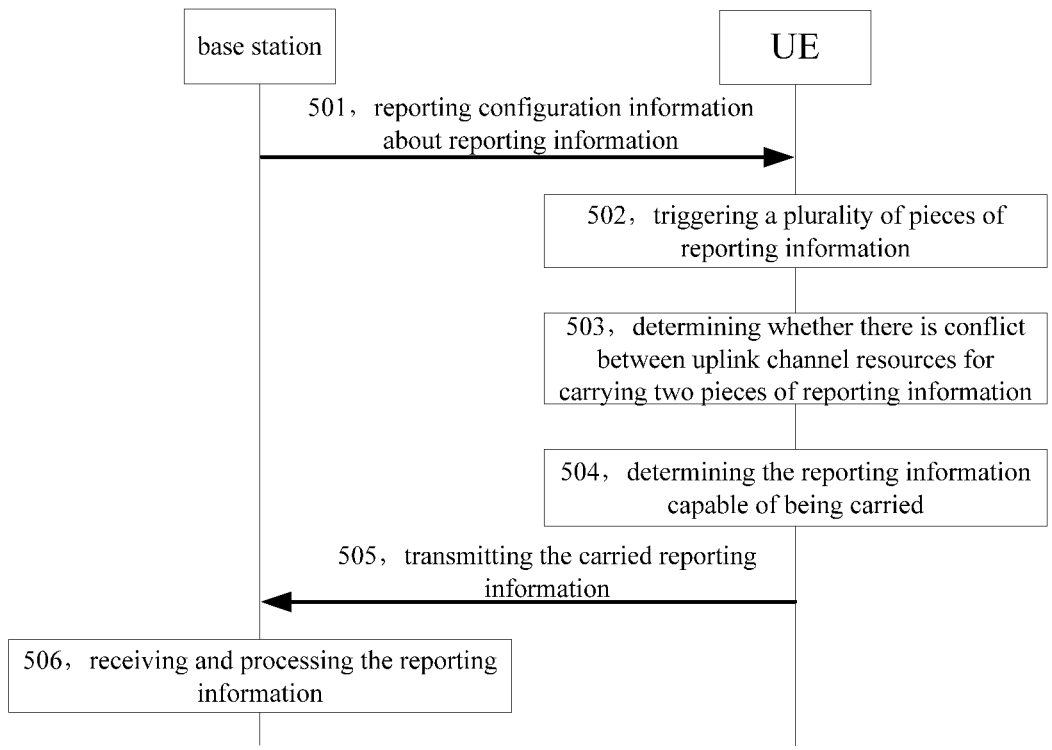
FIG. 5 is another schematic view showing the interaction procedure of the reporting information transmission method according to one embodiment of the present disclosure.

FIG. 5 shows an interaction procedure of the reporting information transmission method. In FIG. 5, the network side device is a base station, and the user side device is a UE. The reporting information transmission method may include the following steps.

Step 501: transmitting, by the base station, configuration information about the reporting information to the UE.

The implementation of Step 501 may refer to Step 201 in FIG. 2. Different from Step 201, in Step 501 a joint processing rule may be selected as a transmission rule. In other words, when there is the conflict, in the uplink channel resources carrying the pieces of reporting information other than the reporting information with the highest priority level, parts of or all of contents in each piece of reporting information capable of being carried may be determined in accordance with the priority levels. In a situation where the joint processing rule is adopted, the reporting information may be reported in a joint encoding manner or in a multiplexing manner.

Step 502: triggering, by the UE, the plurality of pieces of reporting information.

Step 503: determining, by the UE, where there is the conflict between the uplink channel resources for carrying at least two pieces of reporting information.

The implementations of Step 502 and Step 503 may refer to those of Steps 202 and Step 203 in FIG. 2, and thus will not be particularly defined herein.

Step 504: determining, by the UE, the reporting information capable of being carried.

In the embodiments of the present disclosure, the UE may determine the reporting information capable of being carried in accordance with the priority levels of the at least two pieces of reporting information and the available uplink channel resources.

It should be appreciated that, the priority level of each of the beam reporting and the request may be higher than that of the CSI reporting.

Hence, when it is necessary to transmit the beam reporting and the CSI reporting simultaneously and there are still remaining uplink channel resources after the beam reporting has been carried, the remaining uplink channel resources may be used to carry parts of or all of contents in the CSI reporting. When it is necessary to transmit the request and the CSI reporting simultaneously and there are still remaining uplink channel resources after the request has been carried, the remaining uplink channel resources may be used to carry parts of or all of contents in the CSI reporting.

For the request and the beam reporting, when the priority level of the request is higher than that of the beam reporting, the request and the beam reporting need to be transmitted simultaneously and there are still remaining uplink channel resources sufficient for carrying the beam reporting after the request has been carried, the remaining uplink channel resources may be used to carry the beam reporting. When the priority level of the beam reporting is higher than that of the request and there are still remaining uplink channel resources after the beam reporting has been carried, the remaining uplink channel resources may be used to carry the request. Of course, it should be appreciated that, at this time the base station may acquire a situation where the downlink beam link is blocked in accordance with the request, and determine the beam link desired for the downlink transmission in accordance with at least one downlink Tx beam selected by the UE in the beam reporting, a previously-maintained available Tx beam set and candidate beams carried in the request.

Of course, in a scenario where there is the conflict for more than two pieces of reporting information, the reporting information with the highest priority level may be carried by the uplink channel resources. When there are still remaining uplink channel resources, the reporting information with a second highest priority level may be carried; when there are still remaining uplink channel resources, the reporting information with a third highest priority level may be carried, . . . , until all the pieces of reporting information have been carried by the uplink channel resources or the remaining resources are insufficient to carry the remaining reporting information.

In addition, it should be appreciated that, when the CSI reporting is carried, the following contents in the CSI reporting may be carried by the uplink channel resource as many as possible: the Pcell RI, the Scell RI, the Pcell wideband CQI/PMI, the Scell wideband CQI/PMI, the Pcell subband CQI/PMI, and the Scell subband CQI/PMI, which are ranked in a descending order of priority levels.

Of course, when information including the contents with a same type for a plurality of Scells needs to be reported, content about an Scell with a minimum cell index value may be reported preferentially.

In addition, in the embodiments of the present disclosure, during the transmission of the reporting information, information acquired after jointly encoding the to-be-carried reporting information on the uplink channel resource, or the to-be-carried reporting information may be carried by the uplink channel resource in a multiplexing manner.

Step 505: transmitting, by the UE, the carried reporting information.

After the reporting information has been carried by the uplink channel resource, the UE may transmit the reporting information.

Step 506: receiving and processing, by the base station, the reporting information.

Upon the receipt of the reporting information from the UE, the base station may process the reporting information.

It should be appreciated that, when the first reporting information and parts of or all of the contents in the second reporting information are carried by the uplink channel resources and then transmitted by the UE, correspondingly the base station may receive the first reporting information and parts of or all of the contents in the second reporting information on the uplink channel resource.

In a possible embodiment of the present disclosure, when information acquired after jointly encoding the first reporting information and parts of or all of the contents in the second reporting information is carried by the uplink channel resource, the base station may jointly decode the received information so as to acquire the first reporting information and parts of or all of the contents in the second reporting information.

Alternatively, in a possible embodiment of the present disclosure, when the first reporting information and parts of or all of the contents in the second reporting information are carried by the uplink channel resource in a multiplexing manner, the base station may demultiplex the received reporting information so as to acquire the first reporting information and parts of or all of the contents in the second reporting information.

It should be appreciated that, when the received reporting information includes the first reporting information and parts of the contents in the second reporting information, the second reporting information may be the CSI reporting.

Of course, it should be appreciated that, when the remaining uplink channel resources are insufficient to carry all of or parts of the contents in the reporting information other than the reporting information with the highest priority level, the UE may transmit the reporting information in a similar way as that in FIG. 2.

In addition, when there are the other pieces of reporting information apart from the reporting information to be reported in a joint manner, they may be transmitted by the UE on the next available uplink channel resources in accordance with the priority levels.

The specific embodiments have been described hereinabove, and the other embodiments shall also fall within the scope of the appended claims. In some cases, the actions or steps involved in the claims may be performed in an order different from that in the embodiments so as to acquire the desired result. In addition, the steps in the procedures in the drawings may be performed to acquire the desired result in any appropriate order but not limited to the specific order or consecutive order in the drawings. In some embodiments of the present disclosure, multitask processing and parallel processing may also be applicable or advantageous.

Figure 6:
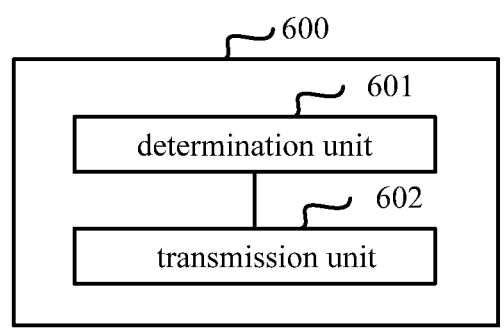
FIG. 6 is a schematic view showing a user side device according to one embodiment of the present disclosure.

The present disclosure further provides in some embodiments a user side device 600 which, as shown in FIG. 6, includes: a determination unit 601 configured to determine whether there is a resource conflict between uplink channel resources for carrying at least two pieces of reporting information, the at least two pieces of reporting information at least including two of a beam failure recovery request, SS block-based beam reporting, CSI-RS-based beam reporting, and CSI reporting; and a transmission unit 602 configured to, when there is the resource conflict between the uplink channel resources, transmit one or more of the at least two pieces of reporting information.

In the embodiments of the present disclosure, one or more pieces of uplink information may be transmitted when there is the conflict between the uplink channel resources for carrying the at least two pieces of reporting information, so as to provide an effective conflict processing mechanism for the resource conflict occurring when the beam reporting, the CSI reporting and the beam failure recovery request are reported. As a result, it is able for a network side device to accurately understand and accept reporting information from a user side device, ensure the reliability and robustness of a beam link preferentially, and use the uplink channel resources to carry the reporting information as much as possible.

In a possible embodiment of the present disclosure, the transmission unit 602 is further configured to preferentially transmit the reporting information with a highest priority level in the at least two pieces of reporting information.

In a possible embodiment of the present disclosure, the at least two pieces of reporting information may include first reporting information and second reporting information. The transmission unit 602 is further configured to transmit the first reporting information on the uplink channel resource and drop the second reporting information. The first reporting information has a priority level higher than the second reporting information.

In a possible embodiment of the present disclosure, the transmission unit 602 is further configured to transmit the second reporting information on an available uplink channel resource next to the uplink channel resource.

In a possible embodiment of the present disclosure, the transmission unit 602 is further configured to transmit the first reporting information on the uplink channel resource in an uplink channel format corresponding to the first reporting information, and the uplink channel format may be used to indicate the type of the reporting information.

Alternatively, in another possible embodiment of the present disclosure, the transmission unit 602 is further configured to carry indication information in a message for transmitting the first reporting information, and the indication information may be used to indicate the type of the reporting information.

In a possible embodiment of the present disclosure, the at least two pieces of reporting information may include first reporting information and second reporting information. The transmission unit 602 is further configured to, when the uplink channel resource is sufficient to carry the first reporting information and parts of or all of contents in the second reporting information, use the uplink channel resource to carry, and transmit, the first reporting information and parts of or all of the contents in the second reporting information on the premise that the first reporting information is carried by the uplink channel resource.

In a possible embodiment of the present disclosure, the transmission unit 602 is further configured to use the uplink channel resource to carry information acquired after jointly encoding the first reporting information and parts of or all of the contents in the second reporting information.

In another possible embodiment of the present disclosure, the transmission unit 602 is further configured to use the uplink channel resource to carry the first reporting information and parts of or all of the contents in the second reporting information in a multiplexing manner.

In a possible embodiment of the present disclosure, the transmission unit 602 is further configured to use the uplink channel resource to carry the first reporting information and parts of the contents in the second reporting information, and the second reporting information may be the CSI reporting.

In a possible embodiment of the present disclosure, the transmission unit 602 is further configured to use the uplink channel resource to carry, and transmit, the following contents in the CSI reporting as many as possible: the Pcell RI, the Scell RI, the Pcell wideband CQI/PMI, the Scell wideband CQI/PMI, the Pcell subband CQI/PMI and the Scell subband CQI/PMI which are ranked in a descending order of priority levels.

In a possible embodiment of the present disclosure, the transmission unit 602 is further configured to preferentially report content about an Scell with a minimum cell index value when information including the contents with a same type for a plurality of Scells needs to be reported.

In a possible embodiment of the present disclosure, the beam failure recovery request, the SS block-based beam reporting, the CSI-RS-based beam reporting and the CSI reporting may be ranked in a descending order of the priority levels as: the beam failure recovery request, the SS block-based beam reporting, the CSI-RS-based beam reporting and the CSI reporting; or the beam failure recovery request, the CSI-RS-based beam reporting, the SS block-based beam reporting and the CSI reporting; the SS block-based beam reporting, the CSI-RS-based beam reporting, the beam failure recovery request, and the CSI reporting; or the CSI-RS-based beam reporting, the SS block-based beam reporting, the beam failure recovery request and the CSI reporting.

In a possible embodiment of the present disclosure, the priority levels of any two of the beam failure recovery request, the SS block-based beam reporting, the CSI-RS-based beam reporting and the CSI reporting may be configured by the network side device or predetermined in a protocol.

In a possible embodiment of the present disclosure, the uplink channel resources for carrying the beam failure recovery request, the SS block-based beam reporting, the CSI-RS-based beam reporting and the CSI reporting may be configured by the network side device, or predetermined by the network side device and a protocol.

In a possible embodiment of the present disclosure, when any of the uplink channel resources is a periodic resource, the uplink channel resource may be configured by the network side device, and configuration information about the uplink channel resource may include a cycle value and an offset value; or the uplink channel resource may be predetermined by the network side device and a protocol, configuration information about the uplink channel resource may include an offset value, and a cycle value of the uplink channel resource may be predetermined in a protocol. Of course, it should be appreciated that, a frequency-domain resource in the uplink channel resources may also be determined.

In a possible embodiment of the present disclosure, when any of the uplink channel resources is an aperiodic resource, the uplink channel resource may be configured by the network side device, and configuration information about the uplink channel resource may include configuration information about a time-domain resource and a frequency-domain resource for an uplink channel.

In a possible embodiment of the present disclosure, the at least two pieces of reporting information may include the first reporting information, the second reporting information and third reporting information, the transmission unit 602 is further configured to preferentially transmit the reporting information with a highest priority level among the first reporting information, the second reporting information and the third reporting information.

Figure 7:
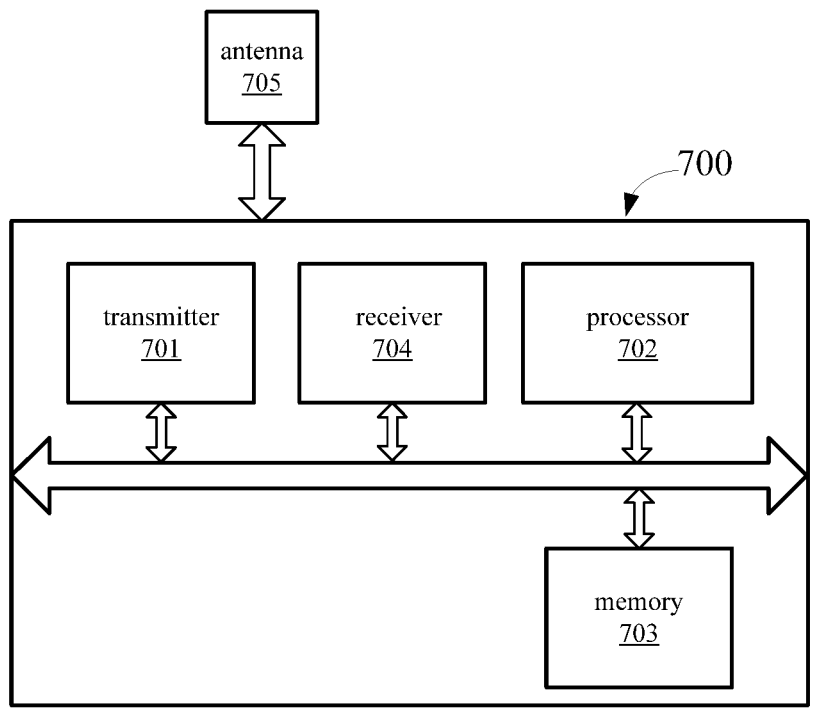
FIG. 7 is another schematic view showing the user side device according to one embodiment of the present disclosure.

The present disclosure further provides in some embodiments a user side device 700 which, as shown in FIG. 7, includes a processor 702, a memory 703, a transmitter 701 and a receiver 704. In actual use, the transmitter 701 and the receiver 704 may be coupled to an antenna 705.

The memory 703 is configured to store therein a program. To be specific, the program may include program codes, and the program codes may include computer-readable instructions. The memory 703 may include a Read-Only Memory (ROM) and a Random Access Memory (RAM), and it is configured to provide instructions and data to the processor 702. To be specific, the memory 703 may include a high-speed RAM, or a non-volatile memory, e.g., at least one magnetic disk.

The processor 702 is configured to execute the program stored in the memory 703.

To be specific, in the user side device 700, the processor 702 is configured to, through the receiver 904 and the transmitter 901: determine whether there is a resource conflict between uplink channel resources for carrying at least two pieces of reporting information, the at least two pieces of reporting information at least including two of a beam failure recovery request, SS block-based beam reporting, CSI-RS-based beam reporting, and CSI reporting; and when there is the resource conflict between the uplink channel resources, transmit one or more of the at least two pieces of reporting information.

The above-mentioned method for the user side device or the UE in FIGS. 1, 2 and 5 may be applied to, or implemented by, the processor 702. The processor 702 may be an integrated circuit (IC) having a signal processing capability. During the implementation, the steps of the method may be completed through an integrated logic circuit of hardware in the processor 702 or instructions in the form of software. The processor 702 may be a general-purpose processor (including a Central Processing Unit (CPU), or a Network Processor (NP)), a Digital Signal Processor (DSP), an Application-Specific Integrated Circuit (ASIC), a Field Programmable Gate Array (FPGA) or any other programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules. The software module may be located in a known storage medium such as an RAM, a flash memory, an ROM, a Programmable ROM (PROM), an Electrically Erasable PROM (EEPROM), or a register. The storage medium may be located in the memory 703, and the processor 702 may read information stored in the memory 703 so as to implement the steps of the method in conjunction with the hardware.

The user side device 700 may also be applied to the method in FIG. 1 and achieve the functions of the user side device or the UE in FIGS. 1, 2 and 5, which will not be particularly defined herein.

The present disclosure further provides in some embodiments a computer-readable storage medium storing therein one or more programs for transmitting reporting information. The one or more programs may be executed by a processor so as to implement the above-mentioned reporting information transmission method.

Figure 8:
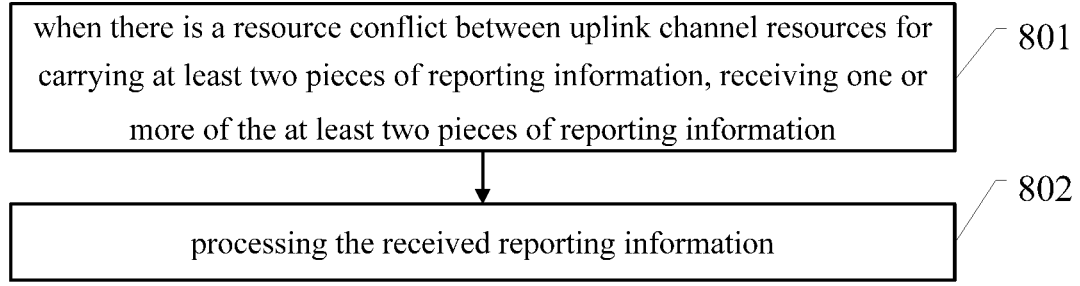
FIG. 8 is a flow chart of a reporting information transmission method according to one embodiment of the present disclosure.

The present disclosure further provides in some embodiments a reporting information transmission method for a network side device which, as shown in FIG. 8, includes the following steps.

Step 801: when there is a resource conflict between uplink channel resources for carrying at least two pieces of reporting information, receiving one or more of the at least two pieces of reporting information.

The at least two pieces of reporting information may at least include two of a beam failure recovery request, SS block-based beam reporting, CSI-RS-based beam reporting, and CSI reporting.

Step 802: processing the received reporting information.

In the embodiments of the present disclosure, the one or more of the at least two pieces of uplink information may be received from a user side device when there is a resource conflict between the uplink channel resources for carrying the at least two pieces of reporting information, so as to provide an effective conflict processing mechanism for the resource conflict occurring when the beam reporting, the CSI reporting and the beam failure recovery request are reported. As a result, it is able for the network side device to accurately understand and accept reporting information from a user side device, ensure the reliability and robustness of a beam link preferentially, and use the uplink channel resources to carry the reporting information as much as possible.

In a possible embodiment of the present disclosure, the at least two pieces of reporting information may include first reporting information and second reporting information. Step 801 may include receiving the first reporting information on the uplink channel resource, and the first reporting information may have a priority level higher than the second reporting information.

The reporting information to be transmitted by the user side device may include the first reporting information and the second reporting information.

In a possible embodiment of the present disclosure, Step 801 may further include receiving the second reporting information on an available uplink channel resource next to the uplink channel resource.

In a possible embodiment of the present disclosure, Step 802 may include processing the first reporting information in accordance with an uplink channel format corresponding to the first reporting information, and the uplink channel format may be used to indicate the type of the reporting information.

Alternatively, in a possible embodiment of the present disclosure, Step 802 may include processing the first reporting information in accordance with indication information carried in the first reporting information, and the indication information may be used to indicate the type of the reporting information.

In a possible embodiment of the present disclosure, the at least two pieces of reporting information may include first reporting information and second reporting information. Step 801 may include receiving the first reporting information and parts of or all of contents in the second reporting information on the uplink channel resource.

In a possible embodiment of the present disclosure, Step 802 may include, when information acquired after jointly encoding the first reporting information and parts of or all of the contents in the second reporting information is carried by the uplink channel resource, jointly decoding the received information so as to acquire the first reporting information and parts of or all of the contents in the second reporting information.

Alternatively, in a possible embodiment of the present disclosure, Step 802 may include, when the first reporting information and parts of or all of the contents in the second reporting information are carried by the uplink channel resource in a multiplexing manner, demultiplexing the received reporting information so as to acquire the first reporting information and parts of or all of the contents in the second reporting information.

In a possible embodiment of the present disclosure, when the received reporting information includes the first reporting information and parts of the contents in the second reporting information, the second reporting information may be the CSI reporting.

In a possible embodiment of the present disclosure, the at least two pieces of reporting information may include the first reporting information, the second reporting information and third reporting information. Step 801 may include receiving the reporting information with a highest priority level among the first reporting information, the second reporting information and the third reporting information in accordance with the priority levels in a descending order.

The method in FIG. 8 may refer to the steps executed by the base station in FIGS. 2 and 5, and thus will not be particularly defined herein.

Figure 9:
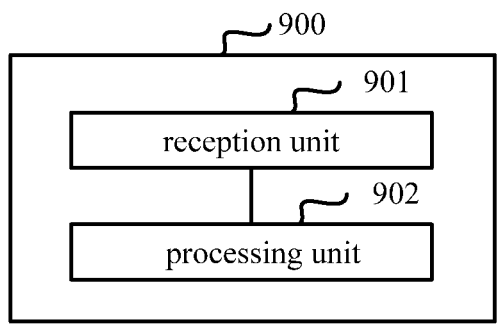
FIG. 9 is a schematic view showing a network side device according to one embodiment of the present disclosure.

The present disclosure further provides in some embodiments a network side device 900 which, as shown in FIG. 9, includes: a reception unit 901 configured to, when there is a resource conflict between uplink channel resources for carrying at least two pieces of reporting information, receive one or more of the at least two pieces of reporting information, the at least two pieces of reporting information at least including two of a beam failure recovery request, SS block-based beam reporting, CSI-RS-based beam reporting, and CSI reporting; and a processing unit 902 configured to process the received reporting information.

In the embodiments of the present disclosure, the one or more of the at least two pieces of uplink information may be received from a user side device when there is a resource conflict between the uplink channel resources for carrying the at least two pieces of reporting information, so as to provide an effective conflict processing mechanism for the resource conflict occurring when the beam reporting, the CSI reporting and the beam failure recovery request are reported. As a result, it is able for the network side device to accurately understand and accept reporting information from a user side device, ensure the reliability and robustness of a beam link preferentially, and use the uplink channel resources to carry the reporting information as much as possible.

In a possible embodiment of the present disclosure, the at least two pieces of reporting information may include first reporting information and second reporting information. The reception unit 901 is further configured to receive the first reporting information on the uplink channel resource, and the first reporting information may have a priority level higher than the second reporting information.

In a possible embodiment of the present disclosure, the reception unit 901 is further configured to receive the second reporting information on an available uplink channel resource next to the uplink channel resource.

In a possible embodiment of the present disclosure, the processing unit 902 is further configured to process the first reporting information in accordance with an uplink channel format corresponding to the first reporting information, and the uplink channel format may be used to indicate the type of the reporting information.

Alternatively, in a possible embodiment of the present disclosure, the processing unit 902 is further configured to process the first reporting information in accordance with indication information carried in the first reporting information, and the indication information may be used to indicate the type of the reporting information.

In a possible embodiment of the present disclosure, the at least two pieces of reporting information may include first reporting information and second reporting information. The reception unit 901 is further configured to, when the uplink channel resource is sufficient to carry the first reporting information and parts of or all of contents in the second reporting information, receive the first reporting information and parts of or all of the contents in the second reporting information on the uplink channel resource.

In a possible embodiment of the present disclosure, the processing unit 902 is further configured to, when information acquired after jointly encoding the first reporting information and parts of or all of the contents in the second reporting information is carried by the uplink channel resource, jointly decode the received reporting information so as to acquire the first reporting information and parts of or all of the contents in the second reporting information.

Alternatively, in a possible embodiment of the present disclosure, the processing unit 902 is further configured to, when the first reporting information and parts of or all of the contents in the second reporting information are carried by the uplink channel resource in a multiplexing manner, demultiplex the received reporting information so as to acquire the first reporting information and parts of or all of the contents in the second reporting information.

In a possible embodiment of the present disclosure, the reception unit 901 is further configured to receive the reporting information including the first reporting information and parts of the contents in the second reporting information, and the second reporting information may be the CSI reporting.

In a possible embodiment of the present disclosure, the at least two pieces of reporting information may include the first reporting information, the second reporting information and third reporting information. The reception unit 901 is further configured to receive the reporting information with a highest priority level among the first reporting information, the second reporting information and the third reporting information in accordance with the priority levels in a descending order.

The network side device 900 is capable of implementing the method in FIG. 8 and achieving the functions of the base station in FIGS. 2 and 5, and thus will not be particularly defined herein.

Figure 10:
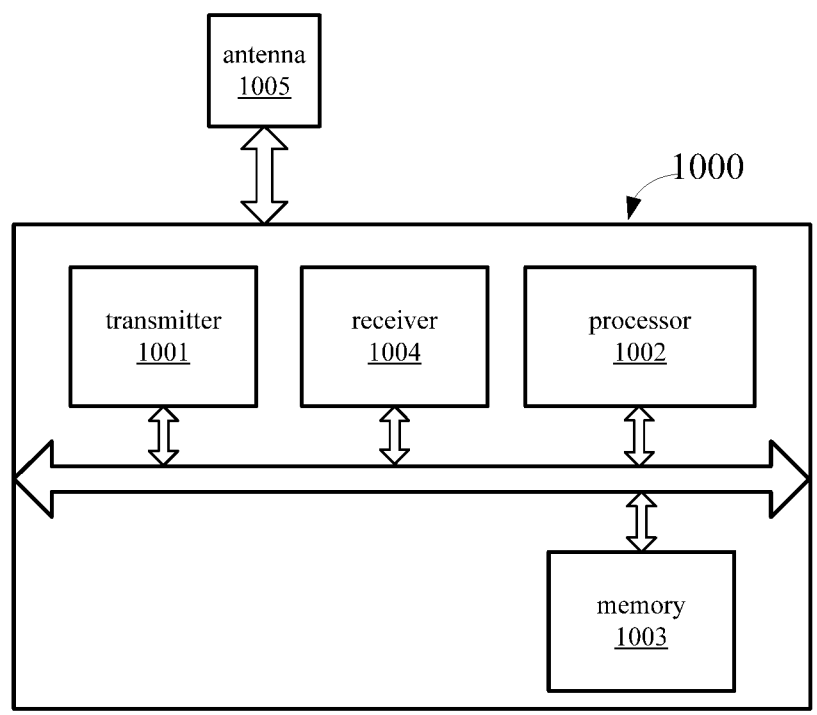
FIG. 10 is another schematic view showing the network side device according to one embodiment of the present disclosure.

The present disclosure further provides in some embodiments a network side device 1000 which, as shown in FIG. 10, includes a processor 1002, a memory 1003, a transmitter 1001 and a receiver 1004. In actual use, the transmitter 1001 and the receiver 1004 may be coupled to an antenna 1005.

The memory 1003 is configured to store therein a program. To be specific, the program may include program codes, and the program codes may include computer-readable instructions. The memory 1003 may include an ROM and an RAM, and it is configured to provide instructions and data to the processor 1002. To be specific, the memory 1003 may include a high-speed RAM, or a non-volatile memory, e.g., at least one magnetic disk.

The processor 1002 is configured to execute the program stored in the memory 1003.

To be specific, in the network side device 1000, the processor 1002 is configured to, through the receiver 1004 and the transmitter 1001: when there is a resource conflict between uplink channel resources for carrying at least two pieces of reporting information, receive one or more of the at least two pieces of reporting information, the at least two pieces of reporting information at least including two of a beam failure recovery request, SS block-based beam reporting, CSI-RS-based beam reporting, and CSI reporting; and process the received reporting information.

The above-mentioned method for the network side device or the base station in FIGS. 2, 5 and 8 may be applied to, or implemented by, the processor 1002. The processor 1002 may be an IC having a signal processing capability. During the implementation, the steps of the method may be completed through an integrated logic circuit of hardware in the processor 1002 or instructions in the form of software. The processor 1002 may be a general-purpose processor (including a CPU, or an NP), a DSP, an ASIC, an FPGA or any other programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules. The software module may be located in a known storage medium such as an RAM, a flash memory, an ROM, a PROM, an EEPROM, or a register. The storage medium may be located in the memory 1003, and the processor 1002 may read information stored in the memory 1003 so as to implement the steps of the method in conjunction with the hardware.

The network side device 1000 may also be applied to the method in FIG. 1 and achieve the functions of the network side device or the base station in FIGS. 1, 2 and 5, which will not be particularly defined herein.

The present disclosure further provides in some embodiments a computer-readable storage medium storing therein one or more programs for transmitting reporting information. The one or more programs may be executed by a processor so as to implement the above-mentioned reporting information transmission method.

In a word, the above embodiments are merely for illustrative purposes but shall not be construed as limiting the scope of the present disclosure. Any modifications, equivalents or improvements made without departing from the spirit and principle of the present disclosure will fall within the scope of the present disclosure.

The system, devices, modules or units mentioned hereinabove may be implemented through a computer chip or entity, or through a product having a certain function. Typically, they may be implemented as a computer. To be specific, the computer may be a personal computer, a laptop computer, a cellular phone, a camera phone, a smart phone, a Personal Digital Assistant (PDA), a media player, a navigation device, an E-mail device, a game console, a flat-panel computer, a wearable device, or a combination thereof.

The computer-readable storage medium may include volatile or non-volatile, mobile or immobile storage medium capable of storing therein information using any method or technique. The information may be a computer-readable instruction, a data structure, a program or any other data. The computer-readable storage medium may include, but not limited to, an RAM (e.g., Phase Change Random Access Memory (PRAM), SRAM or Dynamic Random Access Memory (DRAM)), an ROM (e.g., an Electrically Erasable Programmable Read Only Memory (EEPROM), a flash memory, a Compact Disc Read Only Memory (CD-ROM) or a Digital Video Disk (DVD)), a magnetic storage device (e.g., a cassette magnetic tape or a magnetic disk), or any other non-transmission medium capable of storing therein information which can be accessed by a computing device. As defined in the present disclosure, the computer-readable storage medium may not include any transitory media, e.g., modulated data signal or carrier.

It should be further appreciated that, such terms as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A reporting information transmission method performed by a user side device, comprising:
   determining whether there is a resource conflict between uplink channel resources for carrying at least two pieces of reporting information, the at least two pieces of reporting information at least comprising two of Synchronization Signal (SS) block-based beam reporting, Channel State Information Reference Signal (CSI-RS)-based beam reporting, and Channel State Information (CSI) reporting; and transmitting one or more of the at least two pieces of reporting information, when there is the resource conflict between the uplink channel resources, wherein the at least two pieces of reporting information comprise first reporting information and second reporting information, wherein the transmitting the one or more of the at least two pieces of reporting information comprises:

in the case that the uplink channel resource is sufficient to carry the first reporting information and parts of contents in the second reporting information, using the uplink channel resource to carry, and transmit, the first reporting information and parts of the contents in the second reporting information on the premise that the first reporting information is carried by the uplink channel resource.

2. The reporting information transmission method according to claim 1, wherein the at least two pieces of reporting information comprise first reporting information and second reporting information, wherein the transmitting the one or more of the at least two pieces of reporting information comprises:

transmitting the first reporting information on the uplink channel resource, and dropping the second reporting information, and wherein the first reporting information has a priority level higher than the second reporting information.

3. The reporting information transmission method according to claim 2, wherein the transmitting the one or more of the at least two pieces of reporting information further comprises:

transmitting the second reporting information on an available uplink channel resource next to the uplink channel resource.

4. The reporting information transmission method according to claim 2, wherein the transmitting the first reporting information on the uplink channel resource comprises:

transmitting the first reporting information on the uplink channel resource in an uplink channel format corresponding to the first reporting information, and wherein the uplink channel format is used to indicate a type of the reporting information.

5. The reporting information transmission method according to claim 2, wherein the transmitting the first reporting information on the uplink channel resource comprises:

carrying indication information in a message for transmitting the first reporting information, and wherein the indication information is used to indicate a type of the reporting information.

6. The reporting information transmission method according to claim 2, wherein the first reporting information is the SS block-based beam reporting or the CSI-RS-based beam reporting; and the second reporting information is the CSI reporting.

7. The reporting information transmission method according to claim 1, wherein the using the uplink channel resource to carry the first reporting information and parts of the contents in the second reporting information comprises:

using the uplink channel resource to carry information acquired through jointly encoding the first reporting information and parts of the contents in the second reporting information; or using the uplink channel resource to carry the first reporting information and parts of the contents in the second reporting information in a multiplexing manner.

8. The reporting information transmission method according to claim 1, wherein when the first reporting information and parts of the contents in the second reporting information are carried by the uplink channel resource, the second reporting information is the CSI reporting.

9. The reporting information transmission method according to claim 1, wherein when the second reporting information is the CSI reporting, the using the uplink channel resource to carry the first reporting information and parts of the contents in the second reporting information comprises:

using the uplink channel resource to carry, and transmit, the following contents in the CSI reporting as many as possible: a Primary Cell (Pcell) Rank Indicator (RI), a Secondary Cell (Scell) RI, a Pcell wideband Channel Quality Indicator (CQI)/Precoding Matrix Indication (PMI), an Scell wideband CQI/PMI, a Pcell subband CQI/PMI and an Scell subband CQI/PMI, which are ranked in a descending order of priority levels.

10. The reporting information transmission method according to claim 9, wherein when information including the contents with a same type for a plurality of Scells needs to be reported, the using the uplink channel resource to carry the first reporting information and parts of the contents in the second reporting information comprises:

preferentially reporting content about an Scell with a minimum cell index value.

11. The reporting information transmission method according to claim 1, wherein the SS block-based beam reporting, the CSI-RS-based beam reporting and the CSI reporting are ranked in a descending order of the priority levels as: the SS block-based beam reporting, the CSI-RS-based beam reporting and the CSI reporting; or the CSI-RS-based beam reporting, the SS block-based beam reporting and the CSI reporting; or the SS block-based beam reporting, the CSI-RS-based beam reporting, and the CSI reporting; or the CSI-RS-based beam reporting, the SS block-based beam reporting, and the CSI reporting, wherein the priority levels of any two of the SS block-based beam reporting, the CSI-RS-based beam reporting and the CSI reporting are configured by a network side device or predetermined in a protocol.

12. The reporting information transmission method according to claim 1, wherein the uplink channel resources for carrying the SS block-based beam reporting, the CSI-RS-based beam reporting and the CSI reporting are configured by a network side device, or predetermined by the network side device and a protocol.

13. The reporting information transmission method according to claim 1, wherein the at least two pieces of reporting information comprise the first reporting information, the second reporting information and third reporting information, the transmitting the one or more of the at least two pieces of reporting information comprises:

preferentially transmitting the reporting information with a highest priority level among the first reporting information, the second reporting information and the third reporting information in accordance with the priority levels in a descending order.

14. A reporting information transmission method performed by a network side device, comprising:

receiving one or more of at least two pieces of reporting information, when there is a resource conflict between uplink channel resources for carrying the at least two pieces of reporting information, and wherein the at least two pieces of reporting information at least comprise two of SS block-based beam reporting, CSI-RS-based beam reporting, and CSI reporting; and processing the received reporting information, wherein the at least two pieces of reporting information comprise first reporting information and second reporting information, and wherein the receiving the one or more of the at least two pieces of reporting information comprises:

in the case that the uplink channel resource is sufficient to carry the first reporting information and parts of contents in the second reporting information, receiving the first reporting information and parts of the contents in the second reporting information on the uplink channel resource.

15. The reporting information transmission method according to claim 14, wherein the at least two pieces of reporting information comprise first reporting information and second reporting information, wherein the receiving the one or more of the at least two pieces of reporting information comprises:

receiving the first reporting information on the uplink channel resource, and wherein the first reporting information has a priority level higher than the second reporting information.

16. The reporting information transmission method according to claim 15, wherein the receiving the one or more of the at least two pieces of reporting information further comprises:

receiving the second reporting information on an available uplink channel resource next to the uplink channel resource.

17. The reporting information transmission method according to claim 15, wherein the processing the received reporting information comprises:

processing the first reporting information in accordance with an uplink channel format corresponding to the first reporting information, and wherein the uplink channel format is used to indicate the type of the reporting information; or processing the first reporting information in accordance with indication information carried in the first reporting information, and wherein the indication information is used to indicate the type of the reporting information.

18. The reporting information transmission method according to claim 15, wherein the processing the received reporting information comprises:

processing the first reporting information in accordance with indication information carried in the first reporting information, and wherein the indication information is used to indicate the type of the reporting information.

19. A user side device, comprising a memory, a processor, and a program stored in the memory and executed by the processor, wherein the processor is configured to execute the program so as to implement a reporting information transmission method for the user side device, comprising:

determining whether there is a resource conflict between uplink channel resources for carrying at least two pieces of reporting information, the at least two pieces of reporting information at least comprising two of Synchronization Signal (SS) block-based beam reporting, Channel State Information Reference Signal (CSI-RS)-based beam reporting, and Channel State Information (CSI) reporting; and transmitting one or more of the at least two pieces of reporting information, when there is the resource conflict between the uplink channel resources, wherein the at least two pieces of reporting information comprise first reporting information and second reporting information, wherein the transmitting the one or more of the at least two pieces of reporting information comprises:

in the case that the uplink channel resource is sufficient to carry the first reporting information and parts of contents in the second reporting information, using the uplink channel resource to carry, and transmit, the first reporting information and parts of the contents in the second reporting information on the premise that the first reporting information is carried by the uplink channel resource.

20. A network side device, comprising a memory, a processor, and a program stored in the memory and executed by the processor, wherein the processor is configured to execute the program so as to implement the reporting information transmission method according to claim 14.

* * * * *